(12) United States Patent
Rotzinger et al.

(10) Patent No.: US 8,513,841 B2
(45) Date of Patent: Aug. 20, 2013

(54) WELDED MULTIPARTITE ROTOR FOR A GENERATOR

(75) Inventors: Ralf Rotzinger, Murg-Niderhof (DE); Markus Vogt, Ehrendingen (CH); Reinhard Joho, Rombach (CH)

(73) Assignee: Alstom Technology Ltd., Baden (CH)

( * ) Notice: Subject to any disclaimer, the term of this patent is extended or adjusted under 35 U.S.C. 154(b) by 180 days.

(21) Appl. No.: 12/038,103

(22) Filed: Feb. 27, 2008

(65) Prior Publication Data

US 2008/0211339 A1 Sep. 4, 2008

(30) Foreign Application Priority Data

Mar. 2, 2007 (CH) ........................................ 0350/07

(51) Int. Cl.
*H02K 1/32* (2006.01)
*H02K 9/00* (2006.01)
*H02K 9/06* (2006.01)

(52) U.S. Cl.
USPC ............... 310/61; 310/216.004; 310/216.136; 219/121.14; 29/598

(58) Field of Classification Search
USPC 310/61, 216.004, 216, 216.136; 219/121.14; 415/199.4; 29/598
See application file for complete search history.

(56) References Cited

U.S. PATENT DOCUMENTS

| | | | | |
|---|---|---|---|---|
| 2,317,092 A | * | 4/1943 | Allen | 415/198.1 |
| 2,637,521 A | * | 5/1953 | Constantine et al. | 416/244 R |
| 3,188,833 A | * | 6/1965 | Robinson | 62/505 |
| 3,780,428 A | | 12/1973 | Zorev et al. | |
| 4,063,062 A | * | 12/1977 | Kuhnen | 219/121.14 |
| 4,086,690 A | * | 5/1978 | Bernasconi | 29/889.2 |
| 4,219,717 A | * | 8/1980 | Kuhnen | 219/61 |
| 5,532,454 A | * | 7/1996 | Kuhnen | 219/137 R |
| 6,152,697 A | * | 11/2000 | Konishi et al. | 416/213 R |
| 6,499,946 B1 | * | 12/2002 | Yamada et al. | 415/199.4 |
| 6,753,504 B2 | * | 6/2004 | Keller et al. | 219/137 WM |
| 6,808,362 B1 | * | 10/2004 | Glahn et al. | 415/115 |

(Continued)

FOREIGN PATENT DOCUMENTS

| | | |
|---|---|---|
| CH | 518642 | 3/1972 |
| CH | 563833 | 7/1975 |

(Continued)

OTHER PUBLICATIONS

Oral translation of part numbers in Dutch Patent 1 017 263, Oct. 10, 1957, Otto Martin.*

(Continued)

*Primary Examiner* — Tulsidas C Patel
*Assistant Examiner* — Alex W Mok
(74) *Attorney, Agent, or Firm* — Cermak Nakajima LLP; Adam J. Cermak

(57) ABSTRACT

A rotor (10) for a generator, especially for a turbogenerator, is assembled from a plurality of separate rotor elements (11, 12) which are arranged one behind the other in the rotor axis (18), wherein the rotor elements (11, 12) abut on connecting faces and are welded to one another, forming circular weld seams (17) which concentrically encompass in each case an annular central gap (37) with a predetermined gap width. In order to achieve a maximum magnetically active volume with mechanical stresses which are as low as possible, on the outer circumference of the gap (37) the gap merges into a widening cavity (38) which is adjacent to the weld seam (17).

27 Claims, 4 Drawing Sheets

(56) References Cited

U.S. PATENT DOCUMENTS

| | | | |
|---|---|---|---|
| 6,965,185 B1 * | 11/2005 | Kaminski et al. | 310/261.1 |
| 2006/0231531 A1 * | 10/2006 | Burnett et al. | 219/121.14 |
| 2008/0211339 A1 * | 9/2008 | Rotzinger et al. | 310/216 |

FOREIGN PATENT DOCUMENTS

| | | |
|---|---|---|
| DE | 573512 | 4/1933 |
| DE | 1017263 | 10/1957 |
| DE | 1257793 | 1/1968 |
| EP | 0604754 | 7/1994 |
| EP | 1109017 | 6/2001 |
| EP | 1361642 | 11/2003 |
| EP | 1712324 | 10/2006 |
| JP | 8-090223 | 4/1996 |

OTHER PUBLICATIONS

Manual Translation of Martin, DE 10 172 63, Electric Machine Rotor, Assembled of Multiple Number of Parts, Oct. 10, 1957.*
Search Report for Swiss Patent App. No. 0350/2007 (Mar. 2, 2007).
Search Report from European Patent App. No. 08101883.0 (Jul. 17, 2008).
Notification of Reasons for Refusal from Japanese Patent App. No. 2008-051883 (Feb. 15, 2013).

* cited by examiner

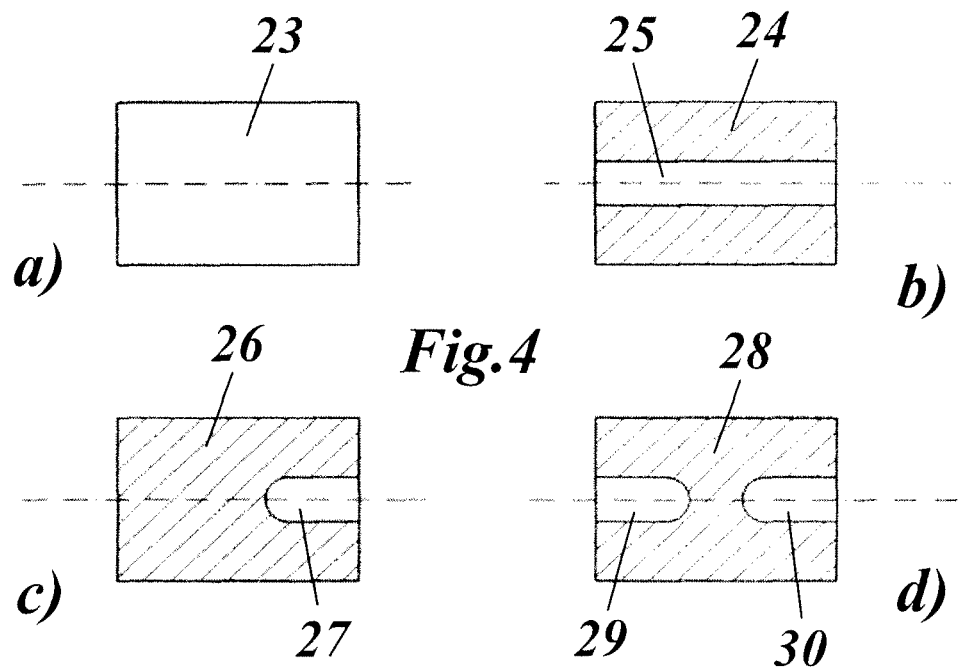
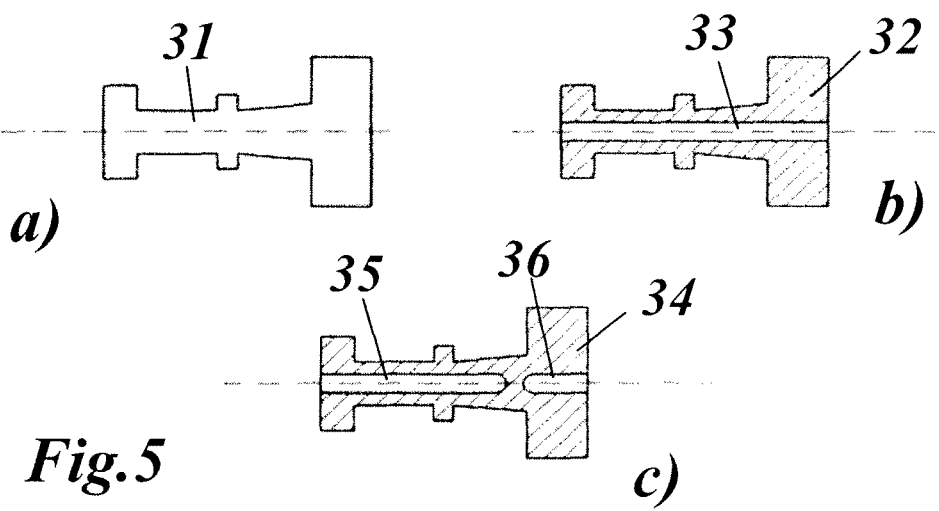

WELDED MULTIPARTITE ROTOR FOR A GENERATOR

This application claims priority under 35 U.S.C. §119 to Swiss Application No. 00350/07, filed 2 Mar. 2007, the entirety of which is incorporated by reference herein.

BACKGROUND

1. Field of Endeavor

The present invention relates to generators for generating electrical energy, and more specifically to turbogenerator rotors.

2. Brief Description of the Related Art

For a long time it has been known to produce rotors of large turbomachines, such as steam turbines or gas turbines, from individual rotor elements which are welded together to form a unit (see, for example, EP A1-0 604 754). As a result of this, it is possible, inter alia, to produce the thermally differently stressed sections of the rotor from different materials, and to optimize the sections of the rotor with regard to cost and stability. Also, in the case of materials purchasing, it is simpler to procure comparatively small disk-shaped elements than to procure a specially manufactured and formed monoblock.

With the rotors of electric generators, especially turbogenerators, the production of the rotor by welding together individual disk-shaped elements up to now has not been enforced. With rotors of turbogenerators, in addition to the mechanical and thermal characteristics, attention is also to be paid to the magnetic and electrical characteristics because the rotors are part of a magnetic circuit and customarily carry a winding. For accommodating the winding, slots, which extend in the axial direction, are provided in the body of the rotor and are radially let into the inside of the rotor with a certain slot depth (see, for example, EP 1 361 642).

Rotors, which are assembled from individual disks, of turbogenerators have at times been proposed in the past: A rotor for turbogenerators, which is assembled from solid disks which are arranged in series axially next to each, is known from DE Patent No. 573 512. The end disks are produced in one piece with the shaft end pieces. The disks are connected to one another on their circumferences by means of weld seams. For supporting the weld seams, it can be advantageous to additionally connect the disks to one another by means of bolts. For stabilization, the disk faces can also be provided in an alternating manner with projections and recesses which interlock.

For increasing the strength, weld seams can also be provided along the winding slots which are cut into the circumference of the rotor. In this case, it is disadvantageous that the narrow weld seams which are restricted to the edge, especially if they are still broken by the winding slots, enable only a limited strength of the welded rotor. Additional weld seams in the slots certainly increase the strength to a certain extent, but are to be realized only at high cost.

A rotor for a turbogenerator is furthermore known from U.S. Pat. No. 3,780,428, in which the rotor body is also constructed by welding along the edges of a number of disks. In this case, additional strength is imparted to the narrow weld seams by the end pieces of the rotor being connected by means of an internal bolt which puts the rotor under compressive strain in the axial direction. Also, these measures for increasing the strength are extremely costly and lead to a very complex construction of the rotor.

Rotors of turbogenerators with deep weld seams have also already been proposed in the past (see DE-B-1-017 263).

In light of a resurgent nuclear business, large rotors (4-pole turbogenerators, individual weight of the generator rotor of up to 300 tons) are again called for. Such large forgings can only be manufactured worldwide by a few vendors to order. A reject risk exists, which possibly can only be established in the subsequent machining state.

Sometimes, with increasing sizes and increasing weight of the forging, inhomogeneities occur with regard to physical characteristics and manufacturing-dependent residual stresses. Smaller forgings, however, can be completely forged very well and hardly any risk is run of the rotor being twisted during the finish process as a result of asymmetries in the material structure.

SUMMARY

One of numerous aspects of the present invention includes a rotor for a generator, especially for a turbogenerator, which is constructed from disk-shaped rotor elements which are welded to one another, and which has a magnetically active volume which is as large as possible with high mechanical strength, and a method for its production.

Yet another aspect of the present invention includes that, on the outer circumference of the gap between the rotor elements which are welded to one another, this gap merges into a widening cavity which is adjacent to the weld seam. As a result of this, it is especially possible to geometrically form the cavity in such a way that on the one hand its volume is as small as possible, and on the other hand the lowest possible mechanical stresses occur in its region.

A further aspect includes that the weld seams on the inner edge have an encompassing root seam in each case, that the cavity comprises an undercut on both sides at the radial level of the root seam, and that the cavity between undercut and gap is delimited by a transition contour.

Yet another aspect includes that the transition contour is linear and leads into the gap at a predetermined angle. Alternatively to this, the transition contour can be formed in the shape of an arc with a predetermined radius.

Another aspect includes that a multiplicity of winding slots for accommodating a winding, which extend in the axial direction, are provided on the rotor and distributed over the circumference, in that the winding slots are oriented with a slot depth in the radial direction, and that the weld seams which are located in the region of the slots have a weld seam depth which is greater than the slot depth of the winding slots.

The rotor elements are advantageously formed essentially cylindrical, and the weld seam depth of the weld seams is advantageously constant over the entire circumference of the rotor.

Furthermore, it is advantageous, for the formation of the gap, if the connecting faces are oriented perpendicularly to the rotor axis and are formed essentially flat.

Another aspect includes that the rotor has a rotor body with a first outside diameter, and two shaft ends with a second and third outside diameter, the first outside diameter is larger than the second and third outside diameters, and weld seams are provided in the region of the body and in the region of the shaft ends. As a result of this, large jumps in the outside diameter in the forgings for the shaft ends can be avoided.

Alternatively to this, the rotor can have a rotor body with a first outside diameter, two shaft ends with a second and third outside diameter, the first outside diameter being larger than the second and third outside diameters, and weld seams are provided only in the region of the rotor body. As a result of this, the sometimes high requirements with regard to straightness and concentricity of the shaft ends can be easily fulfilled.

According to yet another aspect of the invention, as rotor elements the rotor comprises a plurality of disks which are welded to one another close to the two shaft ends, wherein the axial lengths of the disks are different. In this way, for example, thin disks can advantageously be provided at the end of the rotor body.

According to a further aspect, the shaft ends and/or disks can have one or more central cavities which are especially formed as continuous holes or as blind holes. The cavities can be used for material inspections, feeding of excitation current, feed and discharge of cooling media and suchlike. This is especially favorable on account of the cross-shaped magnetic field configuration for 4-pole turbogenerator rotors. The shaft ends in this case can be solidly constructed or constructed with blind holes, for example for sealing against cooling gas or to achieve high mechanical strengths in places. Also, it is conceivable to use disks with a plurality of individual cavities. The size of the cavity of the disks can be different, in order to improve the mechanical behavior of the rotor if necessary. Also, the height of the weld seams in the region of the rotor body can be different.

The gap between the welded disks should have a gap width which is as small as possible. In particular, the gap width is approximately equal to the weld seam width of the weld seam.

Furthermore, for material inspection and/or for feed and discharge of cooling media, radial passages can be provided which lead from the cavities to the outer contour of the rotor or to winding slots which are arranged in the rotor body.

A development of the production method embodying principles of the invention, includes that the rotor is low-stress annealed before turning.

Another aspect includes that rotor elements are used which, on the sides which are to be welded between the cavity and the adjacent weld gap, have encompassing collar webs for centring and for adjustment of the width of the gap, and which by a stepped edge contour interlock with a centring action and are fused during subsequent welding.

BRIEF DESCRIPTION OF THE DRAWINGS

The invention is to be subsequently described in more detail based on exemplary embodiments in conjunction with the drawing. In the drawing

FIG. 4 shows in different partial FIGS. (4a to 4d) different exemplary embodiments for the rotor body of a rotor according to the invention;

FIG. 5 shows in different partial FIGS. (5a to 5c) different exemplary embodiments for the shaft ends of a rotor according to the invention;

DETAILED DESCRIPTION OF EXEMPLARY EMBODIMENTS

Figure 1:
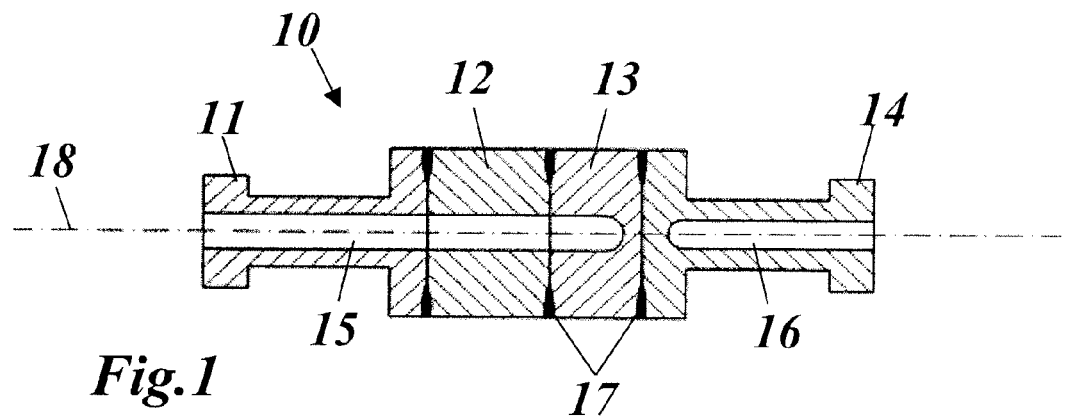
FIG. 1 shows a longitudinal section through a rotor according to an exemplary embodiment of the invention, in which the weld seams are located exclusively in the rotor body and blind holes are introduced into the rotor from both ends.
Figure 2:
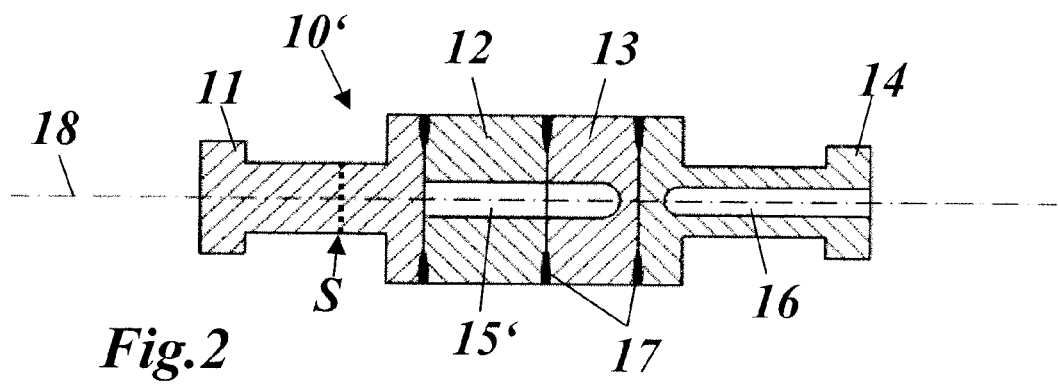
FIG. 2 shows a longitudinal section through a rotor according to another exemplary embodiment of the invention, in which the one shaft end is solidly constructed, and, by a weld seam (S) in the shaft ends, can be constructed without a diameter jump.
Figure 3:
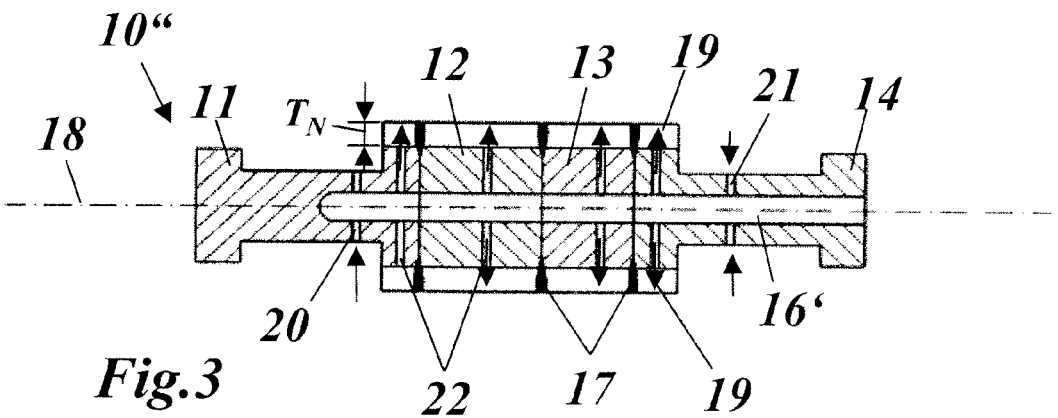
FIG. 3 shows a longitudinal section through a rotor according to a further exemplary embodiment of the invention, in which the winding slots are apparent, and a central blind hole is used for feed of a cooling medium.

In FIGS. 1 to 3, different exemplary embodiments of a turbogenerator rotor embodying principles of the invention are represented in longitudinal section.

The rotor 10 of FIG. 1 is assembled from two disks 12, 13 which are concentrically arranged in the direction of the rotor axis 18 and welded to one another and welded at the ends in each case to a shaft end 11 or 14. The disks 12, 13 and the shaft ends 11, 14 together represent the rotor elements, which are formed essentially cylindrical. The connecting faces of the rotor elements 11, ..., 14, by which the rotor elements are interconnected (welded), are oriented perpendicularly to the rotor axis 18 and formed essentially flat.

The rotor body of the rotor 10 is formed by the two disks 12, 13 and inner sections of the two shaft ends 11, 14, together being rotor elements 11-14. It is characterized by an outside diameter which is enlarged in relation to the shaft ends 11, 14. The winding slots (19 in FIG. 3), which accommodate the rotor winding, are situated in the rotor body. The division of the rotor 10 into the rotor elements 11, 14 in this case has been undertaken so that there are weld seams 17 only in the region of the rotor body. As a result of this, the sometimes high requirements with regard to straightness and concentricity of the shaft ends 11, 14 are easily fulfilled.

The axial lengths of the disks 12, 13 are selected to be varying in length; for example thin disks can be arranged at the end of the rotor body. Central axial holes 15, 16 can be provided in the rotor 10, which in the example of FIG. 1 are formed as two blind holes which reach into the rotor 10 from opposite sides by different distances. The left-hand hole 15 in this case reaches through the left-hand shaft end 11 and through the first disk 12 which is adjacent to it, and terminates in the second disk 13. The right-hand hole 16 terminates in the right-hand shaft end 14 so that no passage exists between the two holes 15, 16. The two holes especially serve for weight optimization (weight reduction). The loss of magnetically active volume which accompanies it is low if the rotor 10 is especially of 4-pole design.

In the case of the exemplary embodiment of FIG. 2, the rotor 10' also includes two shaft ends 11, 14 and two disks 12, 13 which are arranged between them and welded to one another. Unlike the rotor 10 of FIG. 1, however, in this case the left-hand shaft end 11 is solidly constructed, as a result of which, for example, it is suitable for higher torques. The right-hand hole 16 stays the same compared with FIG. 1, however the left-hand hole 15' is reduced in axial length on the two disks 12 and 13. In this case, an additional weld seam S in the shaft end is indicated by the dotted line in the left-hand shaft end 11. As a result of this, large jumps in the outside diameter in the forgings for the shaft ends are avoided.

In the case of the exemplary embodiment of FIG. 3, the winding slots 19, which accommodate the rotor winding and have a slot depth $T_N$, are drawn-in in the body of the rotor 10".

The weld seams 17, which are located in the region of the winding slots 19, advantageously have a weld seam depth ($T_W$ in FIG. 7) which is greater than the slot depth $T_N$ of the winding slots 19. In particular, the weld seam depth of the weld seams 17 can be constant over the whole circumference of the rotor 10, 10', 10". In the example of FIG. 3, the central hole 16', which reaches from one side into the rotor 10", is used as a feed for a (gaseous) cooling medium which is fed into the hole 16' through first cooling gas passages 20, 21 in the region of the shaft end, and which, through second cooling gas passages 22 which are arranged in a distributed manner over the rotor body, cools the rotor winding or the rotor body (see also the flow arrows in FIG. 3).

In FIGS. 4 and 5, different embodiments for the rotor body (FIG. 4) and for the shaft ends (FIG. 5) are represented. The rotor body 23 of FIG. 4a is solidly constructed. The rotor body 24 of FIG. 4b has a continuous central hole 25. The rotor body 26 has a blind hole 27 which extends from the one (right-hand) side. The rotor body 28 of FIG. 4d finally has two blind holes 29 and 30 which are opposed in a mirror-image manner. The associated disks on the inside correspondingly have a (central) cavity which can be used for material inspections, feeding excitation current, and also for feed and/or discharge of cooling media. This is especially advantageous for 4-pole turbogenerator rotors with cross-shaped magnetic field pattern. It is also conceivable to use disks with a plurality of individual cavities. The different cavities can be continuous or discontinuous (blind holes from one or both sides) (in addition, see also FIGS. 1-3).

Disks and shaft ends can have radial holes (for example the cooling gas passages 20-22 in FIG. 3) to the outer contour or to the winding slots (for material inspections, feed and/or discharge of cooling media). The shaft ends can be solidly constructed (shaft end 31), or constructed with blind holes (shaft end 34; blind holes 35, 36), or constructed with a continuous central hole 33 (shaft end 32) (see FIGS. 5a-c), for example for sealing against cooling gas, or in order to achieve high mechanical strengths in places.

The size of the cavity of the disks can be different in order to improve the mechanical behavior of the rotor if necessary. Similarly, the height of the weld seams in the region of the rotor body can be different.

Figure 6:
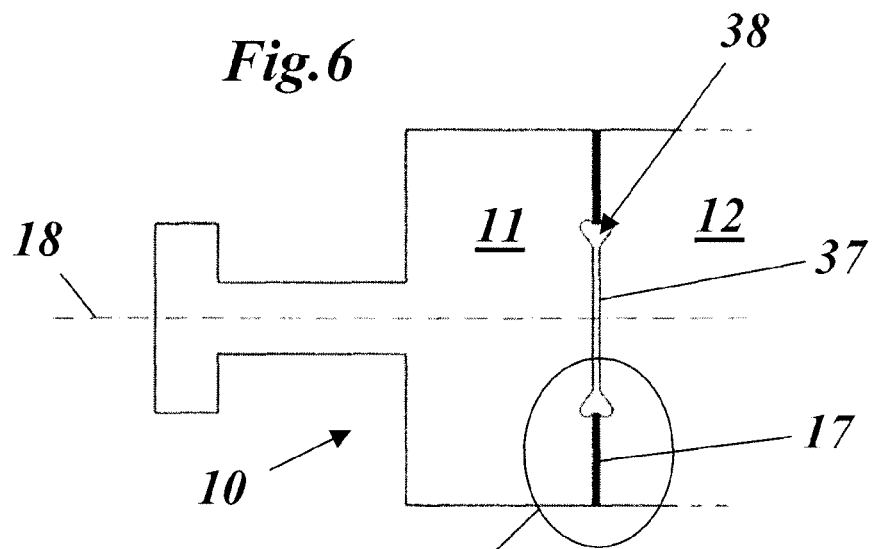
FIG. 6 shows an exemplary embodiment for the design of a welded connection between disk and shaft end of a rotor according to the invention.
Figure 7:
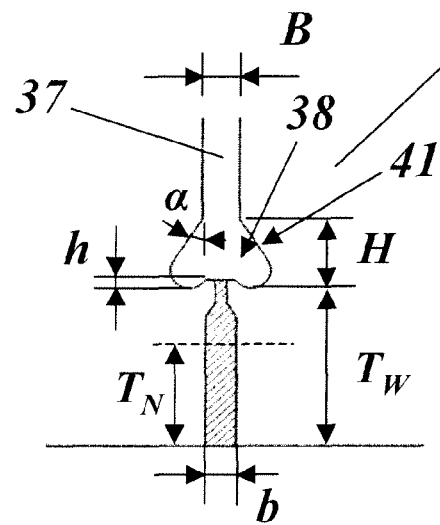
FIG. 7 shows in an enlarged detailed view a possible development of the cavity, which extends around the gap, in the welded connection, with linear transition contour.
Figure 8:
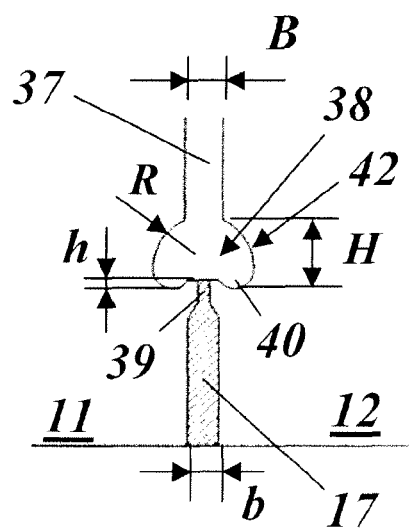
FIG. 8 shows, in an enlarged detailed view, another possible development of the cavity, which extends around the gap, in the welded connection, with transition contour in the shape of an arc.
Figure 9:
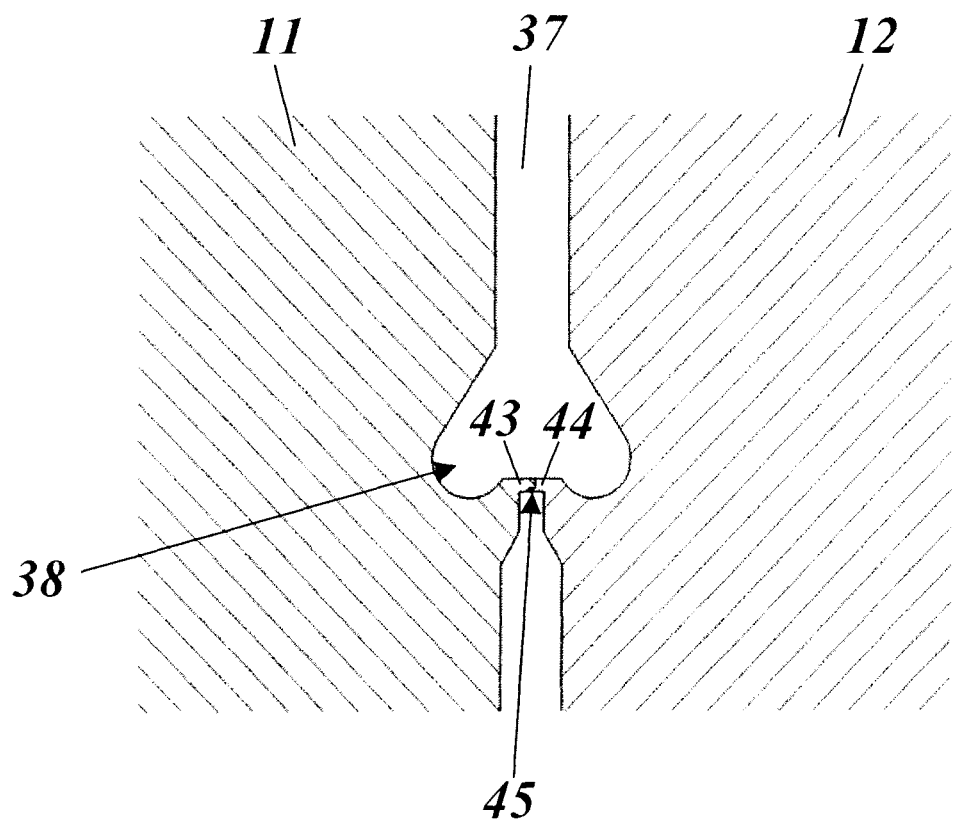
FIG. 9 shows, in an enlarged detailed view, two rotor elements which are adjacent to one another before welding, and which for centring and for keeping the gap open are equipped in each case with an encompassing collar web.

In order to achieve a magnetically active volume of the rotor body which is as large as possible, the cavities beneath the weld seams 17 have a gap 37 which is as small as possible in the rotors according to the invention (FIG. 6). This is achieved by including parallel disk faces, upon the outer edge of which a specially configured cavern in the form of an encompassing cavity 38 is arranged. In order to be able to center the rotor elements 11 and 12, which are to be welded, in relation to one another, and to maintain the gap 37 open during welding, encompassing collar webs 43, 44 with the same radius are provided on both rotor elements 11, 12 according to FIG. 9 between the cavity 38 and the adjacent weld gap, and which by a stepped edge contour 45 interlock with a centring action and are fused during subsequent welding so that the final state which is shown in FIG. 7 or 8 results.

The gap 37 and the cavity 38 are made as follows: The gap width (B in FIGS. 7, 8) between the disks 11, 12 (parallel gap) is as small as possible in order to achieve a maximum magnetically active volume. A customary gap dimension in the axial direction is the weld seam width which ensures a complete inspection of the weld seam.

The cavern 38 on the outer edge of the gap 37 is as small as possible in the radial extent (height H) and axial length, again in order to achieve a maximum magnetically active volume. The cavern 38 is geometrically formed so that mechanical stresses which are as low as possible occur. It generally includes an undercut 40 (on both sides) of height h at the radial level of the root seam 39 of the weld seam 17, and a transition contour 41 or 42 to the parallel gap 37. The transition contour can be constructed in the shape of an arc (42 in FIG. 8; radius R), linearly (41 in FIG. 7; straight line beneath angle α), or by a combination of both.

The manufacture of the rotor 10, 10', 10" is carried out in a way in which the disks 12, 13 are initially welded over 360° with constant depth which is greater than the slot depth $T_N$. Low-stress annealing, if necessary, turning of the whole rotor and cutting of the winding slots 19, are then carried out.

This manufacturing sequence has the following advantages:

- When cutting the winding slots, no swarf falls into the gaps between the disks.
- Good inspection of the welded connection over the supporting height of the rotor teeth (between the winding slots).
- Stocking of standardized disks (which are pre-inspected) enables short lead times.
- The risk of rejection of a monoblock forging, which is manufactured to order, is eliminated (in the case of rejection of a large monoblock, a delivery delay of more than 1 year can result).
- High precision of rotor slots with regard to geometric form in plane and straightness, and parallelity over the whole body length.

| LIST OF DESIGNATIONS | |
|---|---|
| 10, 10', 10" | Rotor (welded, for turbogenerator) |
| 11, 14 | Shaft end |
| 12, 13 | Disk |
| 15, 15', 16, 16' | Hole |
| 17 | Weld seam |
| 18 | Rotor axis |
| 19 | Winding slot |
| 20, 21, 22 | Cooling gas passage |
| 23, 24, 26, 28 | Rotor body |
| 25, 33 | Central hole |
| 27, 29, 30 | Blind hole |
| 31, 32, 34 | Shaft end |
| 35, 36 | Blind hole |
| 37 | Gap |
| 38 | Cavity (cavern) |
| 39 | Root seam |
| 40 | Undercut |
| 41, 42 | Transition contour |
| 43, 44 | Collar web (encompassing) |
| 45 | Edge contour (stepped, interlocking) |
| α | Angle (transition contour) |
| b | Weld seam width |
| B | Gap width |
| h | Height (undercut) |
| H | Height (cavity) |
| R | Radius (transition contour) |
| S | Weld seam (in shaft end) |
| $T_N$ | Slot depth (winding slot) |
| $T_W$ | Weld seam depth |

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A rotor for a generator, the rotor comprising:
    a multiplicity of winding slots for accommodating a winding, the winding slots extending in the axial direction on the rotor and being circumferentially distributed;
    a plurality of separate rotor elements which are arranged one behind the other along a rotor axis, the rotor elements including connecting faces at which adjacent rotor elements abut and are welded to one another, forming circular weld seams which concentrically encompass a central gap with a predetermined gap axial width between every two adjacent rotor elements, the weld seams having a constant axial width substantially the same as the gap width;
    a widening cavity adjacent to each weld seam;
    wherein, on the outer circumference of each gap, the gap merges into the widening cavity; and
    wherein adjacent rotor elements comprise collar webs that are fused together and are not located in the multiplicity of winding slots.

2. The rotor as claimed in claim 1, wherein the cavity has a geometry such that the volume of the cavity is as small as possible, and has the lowest possible mechanical stresses occur in the region of the cavity.

3. The rotor as claimed in claim 1, wherein the weld seams on an inner edge each have an encompassing root seam, and wherein the cavity comprises an undercut on both sides at the radial level of the root seam.

4. The rotor as claimed in claim 3, wherein each cavity between the undercut and the gap is delimited by a transition contour.

5. The rotor as claimed in claim 4, wherein the transition contour is linear and leads into the gap at a predetermined angle.

6. The rotor as claimed in claim 4, wherein the transition contour is arc-shaped with a predetermined radius.

7. The rotor as claimed in claim 1, wherein:
    the winding slots have a slot depth ($T_N$) in the radial direction; and
    the weld seams located in the region of the slots have a weld seam depth ($T_w$) which is greater than the slot depth ($T_N$) of the windings slots.

8. The rotor as claimed in claim 7, wherein the rotor elements are cylindrical, and wherein the weld seam depth ($T_w$) of the weld seams is constant over the entire circumference of the rotor.

9. The rotor as claimed in claim 1, wherein the connecting faces are oriented perpendicularly to the rotor axis and are flat.

10. The rotor as claimed in claim 1, wherein the rotor includes a rotor body with a first outside diameter, and two shaft ends with a second and third outside diameter, the first outside diameter being larger than the second and third outside diameters, and further comprising weld seams in the region of the rotor body and in the region of the shaft ends.

11. The rotor as claimed in claim 10, wherein the rotor elements comprise a plurality of disks welded to one another close to the two shaft ends, and wherein the axial lengths of the plurality of disks are different.

12. The rotor as claimed in claim 11, wherein the shaft ends, the disks, or both, have one or more central cavities.

13. The rotor as claimed in claim 12, wherein the cavities comprise continuous or blind holes.

14. The rotor as claimed in claim 12, further comprising:
    radial passages leading from the cavities to the outer contour of the rotor or to winding slots arranged in the rotor body, the radial passages configured and arranged for at least one of material inspection and feed and discharge of cooling media.

15. The rotor as claimed in claim 1, wherein the rotor includes a rotor body with a first outside diameter, and two shaft ends with a second and third outside diameter, the first outside diameter being larger than the second and third outside diameters, and further comprising weld seams only in the region of the rotor body.

16. The rotor as claimed in claim 15, wherein the rotor elements comprise a plurality of disks welded to one another close to the two shaft ends, and wherein the axial lengths of the plurality of disks are different.

17. The rotor as claimed in claim 16, wherein the shaft ends, the disks, or both, have one or more central cavities.

18. The rotor as claimed in claim 17, wherein the cavities comprise continuous or blind holes.

19. The rotor as claimed in claim 17, further comprising:
    radial passages leading from the cavities to the outer contour of the rotor or to winding slots arranged in the rotor body, the radial passages configured and arranged for at least one of material inspection and feed and discharge of cooling media.

20. The rotor as claimed in claim 1, wherein the gap width is about equal to the weld seam width of the weld seam.

21. The rotor as claimed in claim 1, wherein the widening cavity has an axial width larger than the predetermined gap width.

22. A rotor element to be welded to other rotor elements to manufacture a rotor of an electric generator, the rotor element comprising:
    a multiplicity of winding slots for accommodating a winding, the winding slots extending in the axial direction on the rotor element and are circumferentially distributed;
    at least one connecting face configured and arranged to be welded to at least one connecting face of another rotor element;
    at least one central gap, the at least one central gap having a predetermined axial width;
    at least one widening cavity between the at least one connecting face and the at least one central gap, wherein the at least one central gap merges into the at least one widening cavity at an outer circumference of each central gap; and
    at least one collar web between the at least one widening cavity and the at least one connecting face, wherein the at least one collar web is configured and arranged to be fused during welding and is not located in one of the multiplicity of winding slots;
    wherein the at least one connecting face and the at least one central gap are configured and arranged such that, when the rotor element is welded to said at least one another rotor element, a weld seam is formed between opposing connecting faces, and a gap is defined by one of the central gaps, and the weld seam has a constant axial width substantially the same as the gap width.

23. A rotor element as claimed in claim 22, wherein the collar webs comprise centering elements.

24. A rotor element as claimed in claim 23, wherein the collar webs comprise stepped edges comprising a contour interlock.

25. A method for welding rotor elements to manufacture a rotor of an electric generator, the method comprising:
   providing two rotor elements according to claim 22;
   positioning the rotor elements immediately adjacent to one another along a rotor axis such that a connecting face of one rotor element axially faces a connecting face of the other rotor element;
   connecting the collar webs together; and
   welding together said adjacent connecting faces;
   wherein welding together said adjacent connecting faces comprises fusing the collar webs.

26. A method according to claim 25, wherein welding together said adjacent connecting faces comprises maintaining open the widening gap.

27. A method according to claim 25, wherein welding together said adjacent connecting faces comprises centering the rotor elements.

* * * * *